United States Patent [19]

Grigat et al.

[11] 4,051,212
[45] Sept. 27, 1977

[54] PROCESS FOR THE CONTINUOUS DEGRADATION OF PLASTICS

[75] Inventors: Ernst Grigat; Hartmut Hetzel, both of Cologne, Germany

[73] Assignee: Bayer Aktiengesellschaft, Leverkusen, Germany

[21] Appl. No.: 608,853

[22] Filed: Aug. 29, 1975

[30] Foreign Application Priority Data

Sept. 4, 1974 Germany .............................. 2442387

[51] Int. Cl.² ...................... C07C 87/14; B29H 19/00
[52] U.S. Cl. ....................................... 264/102; 366/75; 366/78; 260/2.3; 260/578; 264/37; 264/176 R; 264/211; 264/DIG. 69; 560/78
[58] Field of Search ................. 264/DIG. 69, 37, 321, 264/68, 101, 102, 349, 176 R, 211; 259/191; 260/2.3, 578, 475 D; 526/914

[56] References Cited

U.S. PATENT DOCUMENTS

| 2,838,801 | 6/1958 | De Long et al. ............ 264/DIG. 69 |
| 3,225,094 | 12/1965 | Wolf .................................... 260/570 |
| 3,229,445 | 1/1966 | Kraft .................................... 264/102 |
| 3,499,952 | 3/1970 | Kolner et al. ................... 264/176 R |
| 3,551,943 | 1/1971 | Staton et al. .................... 264/176 F |
| 3,703,488 | 11/1972 | Morton ................................. 260/2.3 |
| 3,917,507 | 11/1975 | Skidmore .......................... 264/101 |
| 3,954,681 | 5/1976 | Castle ................................. 260/2.3 |
| 3,959,357 | 5/1976 | Tokushige et al. ................... 260/2.3 |

FOREIGN PATENT DOCUMENTS

| 2,362,920 | 7/1974 | Germany .............................. 259/191 |
| 2,362,919 | 7/1974 | Germany .............................. 259/191 |
| 2,362,921 | 7/1974 | Germany .............................. 259/191 |

*Primary Examiner*—Jeffery R. Thurlow
*Attorney, Agent, or Firm*—Gene Harsh; Joseph C. Gil

[57] ABSTRACT

The instant invention relates to a continuous process for the hydrolytic degradation of plastics wherein a hydrolyzable material is introduced with water into a screw machine, and is subjected therein to a temperature of 100 to 300° C, and a pressure of 5 to 100 bars for 2 to 100 minutes. The invention also relates to an apparatus useful in conducting the process.

5 Claims, 2 Drawing Figures

PROCESS FOR THE CONTINUOUS DEGRADATION OF PLASTICS

BACKGROUND OF THE INVENTION

Even today, waste products of relatively easily degradeable plastics, such as polyurethanes, polyesters, polycarbonates and polyamides are still burned or dumped. Economically and ecologically, however, it would be much more desirable to degrade these hydrolytically degradeable polymers into their starting components which could then be reused for the production of plastics.

It is known that, for example, polyurethane foam waste can be degraded into its low molecular weight starting compounds at elevated temperature and pressure (for example 40 bars and 240° C) in a stirrer-equipped autoclave, the polyisocyanate originally used in the synthesis of the polyurethane foam being hydrolyzed into the corresponding polyamine. The complete hydrolytic degradation of polyurethane foam waste under the conditions specified in such an autoclave would take about one hour. Any process of this kind, however, is only of economic and commercial interest if it can be carried out continuously.

Processes for hydrolyzing polyurethane foam waste are known and are described, for example, in German Offenlengungsschrifts Nos. 2,362,919; 2,362,920 and 2,362,921. According to the last of these Offenlegungsschrifts, hydrolysis is carried out in batches in a closed reaction zone whereas according to Offenlegungsschrifts Nos. 2,362,919 and 2,362,920 hydrolysis is carried out continuously (a) in a fluidized bed and (b) in a defined, tubular reaction zone, respectively. Unfortunately, these process are attended by a number of disadvantages.

Thus, the entire fluidizing gas must be heated to the reaction temperature (250°–400° C) in the reactor and subsequently cooled again in order to condense the diamine. Vast quantities of energy are necessarily wasted. Additionally, the reaction zone used to carry out hydrolysis has to be extremely large because the already extremely voluminous foam takes up even more space as a result of fluidization. Additionally, hot, unhydrolyzed and partially hydrolyzed foam particles have a marked tendency to stick together. The reaction zone which is not continuously scraped by suitable means very soon becomes blocked up. Finally, the individual foam particles are surrounded by a coating of hydrolysis product. Unfortunately little or no reaction takes place inside them since no shear forces act upon the particles.

DESCRIPTION OF THE INVENTION

Figure 1:
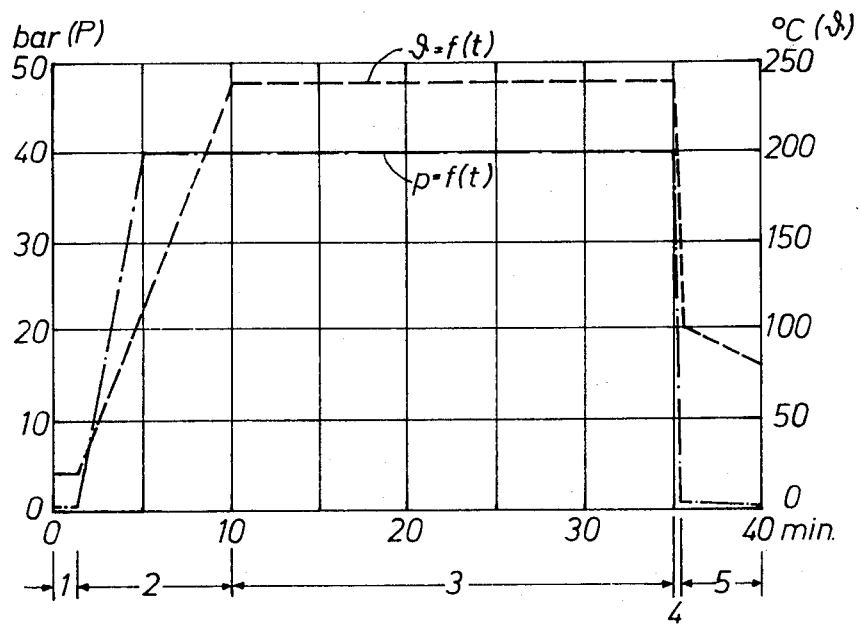
FIG. 1 represents pressure-time and temperature time graphs of the process of the instant invention.

It has now been found that a variety of different hydrolytically degradeable waste plastics can be degraded into their starting compounds very easily, economically, continuously and in a controlled manner by means of a specially equipped screw machine.

Accordingly, the present invention relates to a process for the continuous hydrolytic degradation of waste plastics comprising introducing waste of hydrolyzable plastics material together with water and, optionally, hydrolysis catalysts into a screw machine where the mixture of water and plastic waste is exposed to a temperature of 100 to 300° C and a pressure of 5 to 100 bars for 2 to 100 minutes in a reaction zone, accompanied by intensive mass and heat exchange. The liquid-gas mixture formed during hydrolysis is continuously introduced into a nozzle which is connected to the screw machine and from which the gas leaves through a regulating valve maintaining the constant screw-machine pressure in the nozzle, and the liquid leaves through a regulating valve maintaining a constant liquid level in the nozzle.

The invention also relates to a screw machine for carrying out the process of the invention. The screw machine consists of:

a. a tubular housing having
  1. an air vent means,
  2. a water inlet means,
  3. a material feed hopper means located between said vent means and said inlet means, and
  4. a material outlet nozzle provided with
    i. a presssure measuring and regulating means, and
    ii. a liquid level measuring and regulating means,
b. a screw shaft arranged in said housing, said screw shaft comprising
  1. a first screw threaded section of high pitch extending beyond said feed hopper means in the direction of flow,
  2. adjacant to said first section, a second screwthreaded section of lower pitch than said first section, and
  3. adjacent to said second section, kneading discs fitted to said screw shaft, said water inlet means opening into said second section.

In general, the first section (b) (1) has a pitch of more than 90 mm and preferably more than 100 mm. The second section (b) (2) has a pitch of less than 70 mm, preferably less than 60 mm, and most preferably less than 45 mm. (These figures refer to a double-thread screw with a diameter of 90 mm; for other dimensions of the screw the pitches have to be varied accordingly).

The following individual steps take place in succession or simultaneously in the process according to the invention:

1. Continuous delivery and venting of the plastic waste;
2. Continuous delivery of water;
3. Pressure buildup in the plastic/water mixture to approximately 5–100 bars, preferably 10–80 bars and, most preferably 30–50 bars;
4. Temperature buildup in the plastic/water mixture to approximately 100°–300° C, preferably 150°–270° C and, most preferably to 200°–250° C;
5. Intensive mass exchange in which hydrolytic degradation takes place in about 2 to 100 minutes, preferably in 5 to 100 minutes and, most preferably in 10 to 40 minutes;
6. Relieving the hydrolysis products of pressure (in the case of a foam of polyether and tolylene diisocyante: polyether, tolylene diamine, $CO_2$ and water) to 0 bar;
7. Discharging the gaseous hydrolysis products;
8. Cooling the liquid hydrolysis products to approximately 50 to 100° C;
9. Continuous delivery of the liquid hydrolysis products to a separation means;

10. Separation of the hydrolysis products, for example by washing, extraction or distillation.

The process described above may be followed schematically from the pressure-time and temperature-time graphs shown in FIG. 1:

The graph shows the variation of the temperature and pressure to which the material to be hydrolyzed is exposed during the process of the invention as a function of time. After the plastic waste and water has been introduced and vented[zone (1) in FIG. 1], pressure and temperature are built up[zone c2)]. The material is then hydrolytically degraded[zone (3)]. After the hydrolysis products have been relieved of pressure to 0[zone (4)], they are cooled and discharged[zone (5)].

It is generally difficult to buildup the pressure in the plastic/water mixture to the high pressures required. This is particularly true when it is recognized that their buildup must be accompanied by venting, an intensive mass and heat exchange in the reaction zone for about 30 minutes with a narrow residence-time spectrum in a low-viscosity liquid mixture and the formation of a gas from a solid. Additionally, the pressure must be maintained while at the same time the liquid-gas mixture must be continuously discharged from the reaction zone.

Figure 2:
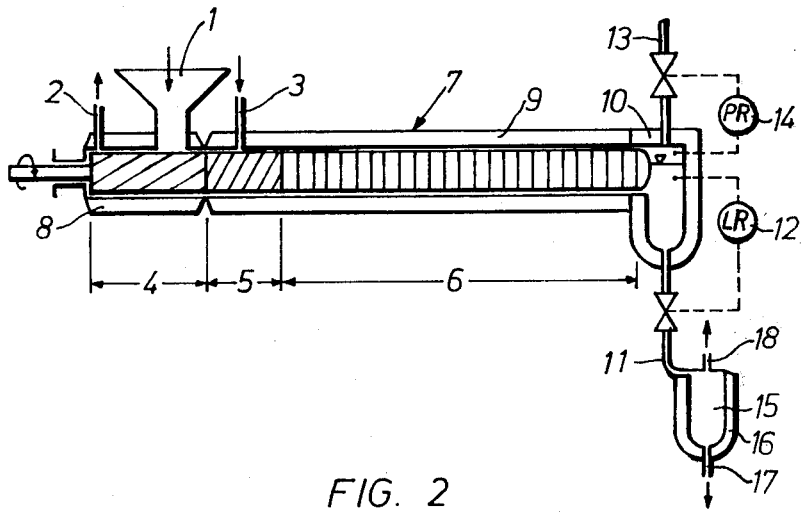
FIG. 2 represents one type of screw machine useable in practicing the instant invention.

One particularly suitable arrangement for carrying out these process steps is a screw machine which is equipped as illustrated in FIG. 2.

After size reduction, the plastic is introduced into the screw machine through a material feed hopper means (1). Air can escape against the flow direction before the feed hopper through an air vent means (2) in the tubular housing. A gentle vacuum may be applied if desired. Just after the hopper (looking in the flow direction), water is introduced into the screw machine (preferably by a nozzle) through a water inlet means (3) in the housing.

The threading of the screw shaft is divided into different zones: a thread of high pitch [feed thread c4) approximately 15% of the overall length of the screw] is used in the first part of the screw machine, extending to a point just beyond the feed hopper (1). A low-pitch thread is then used for compressing the plastics material (pressure buildup-thread (5), approximately 15% of the overall length of the screw). After the pressure buildup-thread, kneading discs (6) are pushed onto the rest of the screw shaft (approximately 70% of the overall length of the screw).

The entire screw housing (7) is provided with a heat-exchange system[cooling c8) and heating c9)]. At the exit area of the screw housing, from which the screw shaft projects to a certain extent, is screwed a special nozzle (10). This nozzle is provided with both a pressure and liquid level gauge. Additionally, the nozzle has pipe connections at the top and bottom thereof. A liquid-gas mixture enters the nozzle and the liquid portion issues through the down pipe (11), a constant liquid level being maintained by the regulator (12). The gas leaves the nozzle through the upwardly extending pipe (13), a constant pressure being maintained in the nozzle (and hence in the reaction zone) by the regulator (14). The liquid hydrolysis products are delivered continuously into a cyclone separator (16) provided with a cooling system (15), from which both the gas phase (18) formed during pressure release and the liquid phase (17) can be run off. Following phase separation into an organic phase and, optionally, an aqueous phase, the organic phase can be separated into its components in known manner (for example by distillation, extraction with acids or bases, and the like).

The pressure and liquid level regulating means useable are of a type generally known in the art, and need not be described herein.

In order to obtain a high throughput during the necessary relatively long residence time in the reaction zone (about 30 minutes), the screw should be of large volume, i.e. should be low-cut. A narrow residence-time spectrum is best obtained by using a screw machine with double screws rotating in the same direction.

In order to accelerate the hydrolysis reaction, it is also possible to add to the water introduced into the screw machine, either acid or basic hydrolysis catalysts (depending upon the type of plastics), preferably those which can readily be removed from the hydrolysis products by neutralization and washing (for example aqueous mineral acids or aqueous alkali and alkaline earth hydroxide solutions).

As already mentioned, the process according to the invention may be applied in principle to any hydrolytically degradeable plastics, i.e. for example to polyesters, polycarbonates, polyamides and polyurethanes. However, the process according to the invention is preferably used for degrading waste based on polyurethanes synthesized from polyethers and polyisocyanates, because the hydrolysis products formed in that case can be separated particularly easily and directly used for processing.

EXAMPLE

The machine used for the Example (Werner & Pfleiderer's type ZDS- KG 90) comprises two screws rotating in the same direction at a speed of 120 rpm having a shaft diameter of 90 mm, a length of 2200 mm and a volume of 8.2 liters. The nozzle has a volume of approximately 0.5 liter, the throughput amounting to 25 kg/h for a residence time in the screw of approximately 20 minutes.

The pitch of the screw thread in the 650 mm long feed zone is 120 mm (double-thread), and in the 650 mm long pressure-buildup zone 60 mm (double-thread). The adjoining reaction zone consists of a 1300 mm long kneading zone with kneading blocks, followed by a threaded zone with a pitch of 60 mm (double-thread).

A. Production of the polyurethane foam 100 parts by weight of an NCO prepolymer having an NCO content of 8.2% by weight, obtained from 100 parts by weight of a linear polypropylene glycol (OH-number 56) and 34.7 parts by weight of tolylene diisocyanate (65% of 2,4-isomer and 35% of 2,6-isomer),
 3 parts by weight of ethyl morpholine,
 1.8 parts by weight of water,
 0.5 parts by weight of diethyl amine oleate and
 1.0 parts by weight of polydimethyl siloxane
were intensively mixed in a high speed stirrer. The product was then heated for 2 hours at 100° C. A soft-elastic foam having a density of 50 kg/m$^3$ was formed.

B. Process according to the invention 100 parts of the size-reduced polyurethane foam and 20 parts of water were continuously introduced into the machine described above which was equipped as illustrated in FIG. 2 (throughput: 25 kg/h). $CO_2$ and $H_2O$ as gas phase, and a mixture of polyether, tolylene diamine and water as liquid phase, were continuously removed from the nozzle. The liquid phase could readily be separated into its components by extraction with dilute aqueous hydrochloric acid.

What is claimed is:

1. A process for the continuous hydrolytic degradation of waste plastics comprising
    a. continuously introducing a hydrolyzable plastic waste material into a screw machine,
    b. continuously allowing air to escape from said screw machine,
    c. continuously introducing water into said screw machine, thereby producing a plastic-water mixture,
    d. subjecting said mixture to a temperature of from 100° to 300° C, a pressure from 5 to 100 bars, and intensive screw mixing in a reaction zone of said screw machine for a period of from 2 to 100 minutes whereby liquid and gaseous hydrolysis products are formed,
    e. continuously allowing the liquid and gaseous hydrolysis products to enter a liquid-gas separatory nozzle,
    f. continuously allowing the liquid to leave the nozzle through a first regulating valve which maintains a constant liquid level in the nozzle, and
    g. continuously allowing the gas to leave the nozzle through a second regulatory valve which maintains a constant pressure in the nozzle at a pressure of the reaction zone.

2. The process of claim 1, wherein the machine used comprises inter-engaging screw shafts rotating in the same direction.

3. The process of claim 2, wherein the screw shafts are fitted with kneading discs in the reaction zone.

4. The process of claim 1 wherein the water is introduced into the screw machine through a nozzle.

5. The process of claim 1, wherein the air introduced with the plastic waste is removed through a bore in the housing which is arranged in front of the feed hopper for the plastics material and to which a vacuum is applied.

* * * * *